(No Model.) O. T. BAKER, Dec'd.
E. BAKER, Administratrix.
WAGON BRAKE.
No. 580,031. Patented Apr. 6, 1897.
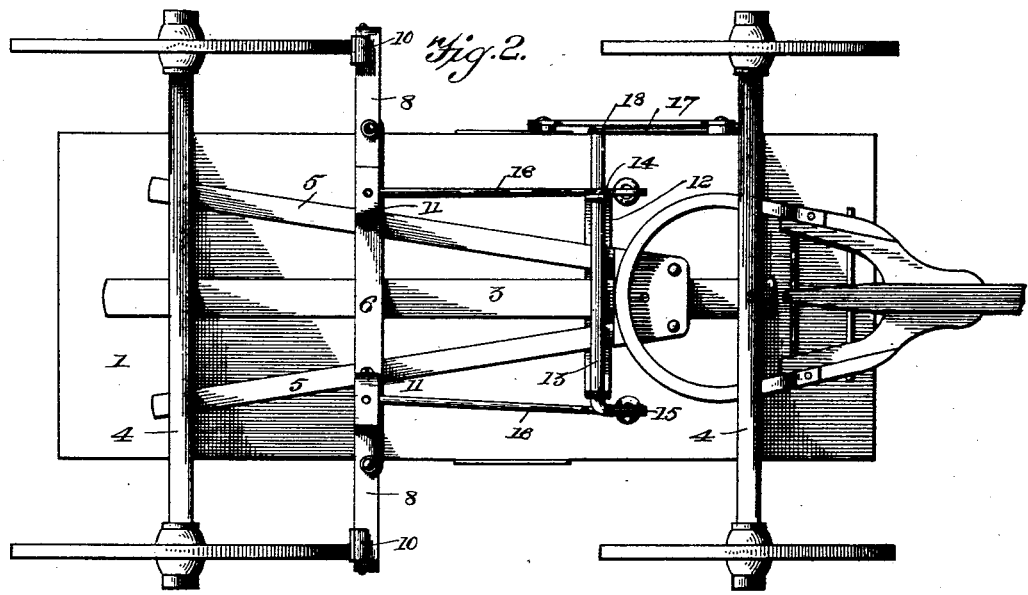
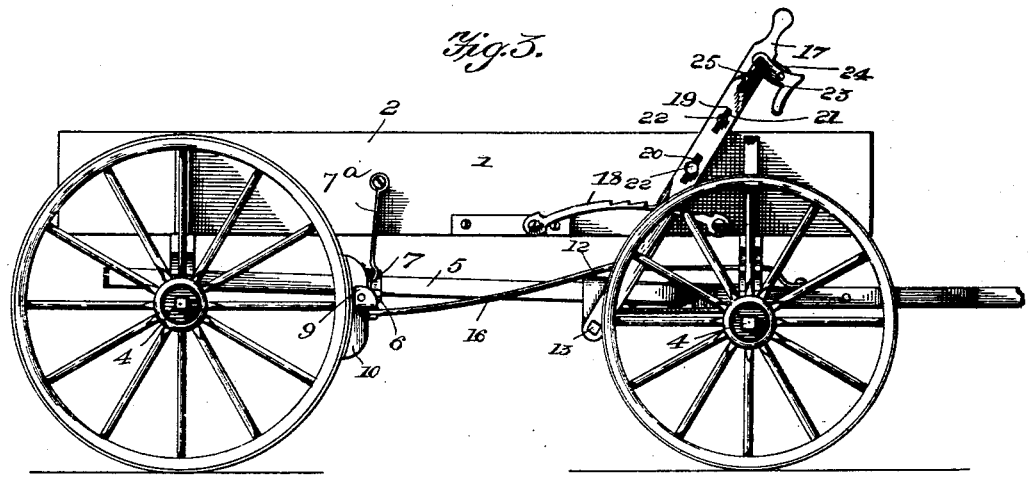
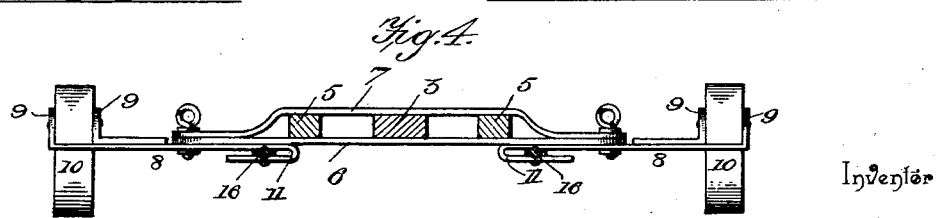
Witnesses
E. H. Monroe
R. M. Smith
Inventor
Owen T. Baker:
By his Attorneys.
C. A. Snow & Co.

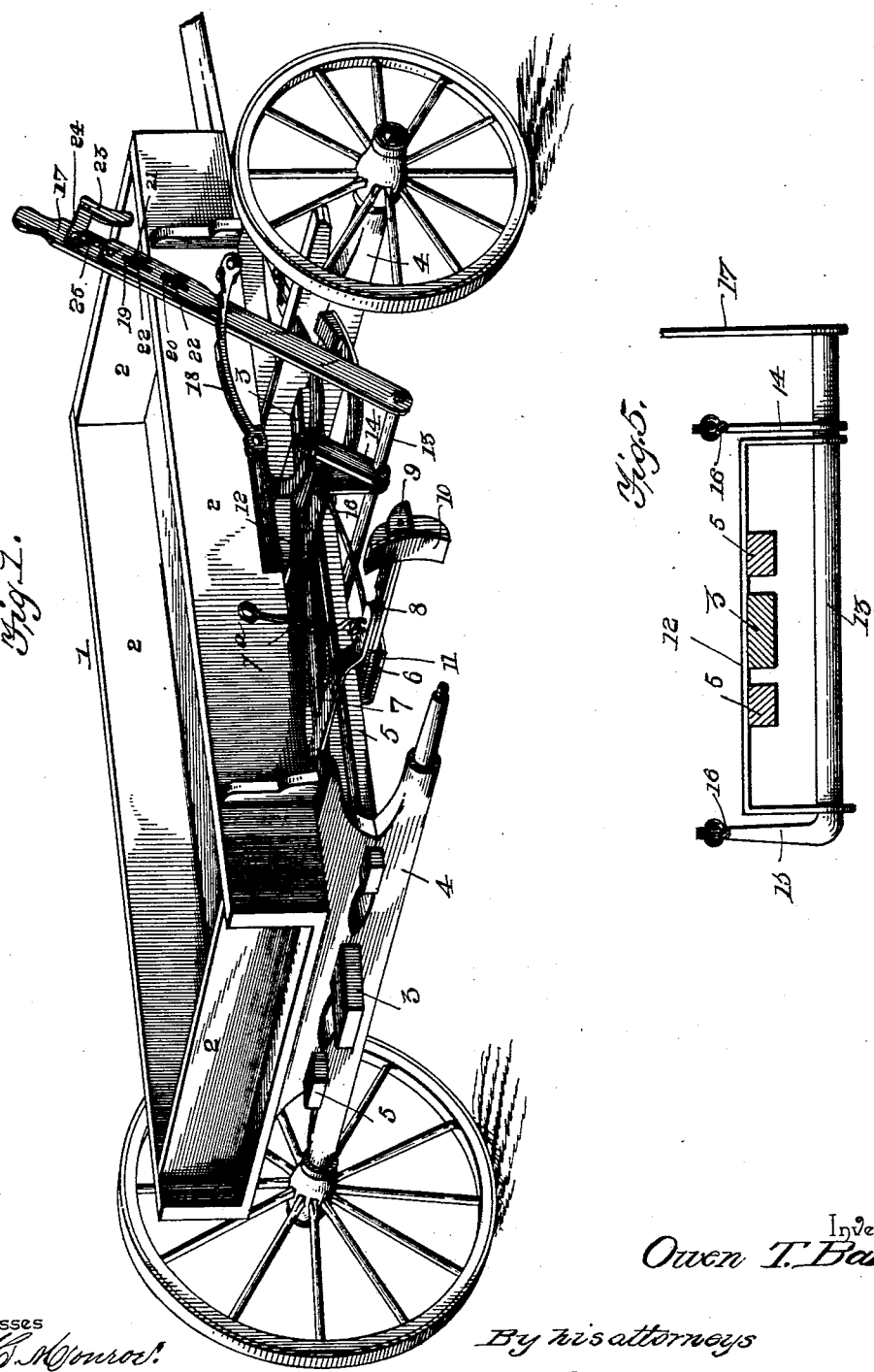

UNITED STATES PATENT OFFICE.

OWEN T. BAKER, OF FORT WORTH, TEXAS; EMILY BAKER, ADMINISTRATRIX OF SAID OWEN T. BAKER, DECEASED, ASSIGNOR OF ONE-HALF TO S. T. FOSTER, OF ALVORD, TEXAS.

WAGON-BRAKE.

SPECIFICATION forming part of Letters Patent No. 580,031, dated April 6, 1897.

Application filed February 11, 1895. Renewed February 16, 1897. Serial No. 623,716. (No model.)

*To all whom it may concern:*

Be it known that I, OWEN T. BAKER, a citizen of the United States, residing at Fort Worth, in the county of Tarrant and State of Texas, have invented a new and useful Wagon-Brake, of which the following is a specification.

My invention relates to an improvement in wagon-brakes.

The object of my invention is to make a brake which is quickly applicable to any form of wagon and which is attached to the wagon-gear only and has no connection with the body of the wagon, thus allowing the wagon-body to be entirely removed from the bolsters without interfering with the action and operation of the brake mechanism.

The invention consists in certain novel features and details of construction and arrangement of parts, as hereinafter fully described, illustrated in the drawings, and finally pointed out in the claim.

In the accompanying drawings, Figure 1 is a perspective view of a wagon containing my improved brake mechanism. Fig. 2 is a bottom plan view of the same; Fig. 3, a side elevation thereof. Fig. 4 is a front elevation of the rear transverse double bar or bracket to which the brake-beams are pivoted. Fig. 5 is a similar view of the rock-shaft bracket, the rock-shaft, brake-levers, and the hand-lever.

Similar numerals of reference indicate corresponding parts in all the figures of the drawings.

1 represents a wagon-body of any ordinary construction provided with the usual side and end boards 2 2.

3 represents the reach-pole connecting the axles 4 4, and 5 5 the hounds interposed between the rear axle and the forward end of the reach-pole and inclined in the usual manner.

6 indicates a bracket extending across the reach-pole and hounds transversely thereof and about in line with the fellies of the rear wheels at their forward edges.

7 indicates a similar bar or supplemental piece or brace connected with the bar 6 and passing over and above the reach-pole and hounds, the bar 6 underlying the same. The bracket, consisting of the bars 6 and 7, is secured to the hounds by through-bolts and nuts or in any suitable and convenient manner.

8 8 indicate two pivoted brake-beams hinged at or near their centers to the outer ends of the bracket 6 7 by means of eyebolts passing through said brake-beams and the supporting-bracket and provided above said bracket with eyes for the reception of hooks $7^a$, one on either side of the wagon-body. These hooks rigidly connect the bracket 6 and wagon-body and serve to effectively support and brace the projecting ends of said bracket with relation to the wagon-body at the pivotal points of the brake-beams 8. The brake-beams 8 are provided at their outer ends with parallel ears or lugs 9, to and between which suitable brake-shoes 10 are pivoted, as shown in the drawings. The opposite inner ends of the brake-beams 8 are bent over, as indicated at 11, for the purpose of receiving the rear ends of the brake-rods and are perforated to receive a suitable bolt each for connecting the brake-rod thereto.

12 indicates an angular bracket secured to the upper faces of the hounds and reach-pole in advance of the bracket 6 7 or nearer the forward end of the wagon. The bracket 12 is provided with downwardly-extending arms at right angles thereto perforated at their lower ends to receive a horizontal rock-shaft 13. The rock-shaft 13 has two crank-arms 14 and 15, preferably located outside of the downwardly-extending arms on the bracket 12.

16 16 indicate the brake-rods which connect the crank-arms 14 and 15 with the inner ends of the pivoted brake-beams 8.

The rock-shaft 13 extends laterally beyond the crank-arm 14 a sufficient distance to receive a vertical lever 17, extending upwardly close to and upon one side of the wagon-body within convenient reach of the driver in his seat on the wagon.

18 indicates a toothed quadrant or segmental rack secured to the side of the wagon-body and adapted to be engaged by a sliding latch mounted upon and adjustable relatively to said lever 17.

19 indicates said sliding latch, which I have shown in the form of a flat bar provided at its lower end with a tooth or point adapted to engage the teeth of said segmental rack and provided with elongated slots 20 and 21, adapted to receive and slide upon headed pins 22, projecting laterally from the lever 17.

23 is an elbow-lever pivoted to a lateral extension 24 on the lever 17 and connected at one end to the upper end of the sliding latch by means of an interposed loop 25. By grasping the other arm of the elbow-lever 23 and rocking it the sliding latch may be withdrawn from the segmental rack 18, permitting the operating-lever 17 to be vibrated for applying and releasing the brakes.

By changing the lengths of the several crank-arms on the rock-shaft 13 and the length of the brake-beams or the location of the bolts upon which the brake-beams are swiveled it will be apparent that the leverage may be increased or diminished at will to suit the weight and size of the wagon.

Other parts of the wagon not particularly described may be constructed in any usual or preferred manner.

Having described my invention, I claim—

In a brake mechanism for vehicles, the combination with the reach and hounds, of a transversely-disposed duplex bracket secured to and embracing the same and projecting at its ends beyond the hounds, said bracket consisting of two straps, one passing beneath and the other above the hounds, one of said straps having its end portions deflected and united to the opposing strap, brake-beams fulcrumed on the projecting ends of said bracket, eyebolts passing through the brake-beams and bracket and constituting the fulcrums of the brake-beams, the wagon-body having hooks capable of being moved into and out of engagement with the eyes of said bolts and forming braces between the wagon-body and the brake-beam-supporting bracket, and suitable brake connections for operating the said brake-beams, substantially as described.

In testimony that I claim the foregoing as my own I have hereto affixed my signature in the presence of two witnesses.

OWEN T. BAKER.

Witnesses:
D. T. TAYLOR,
M. L. HARRELL.